Patented Oct. 14, 1947

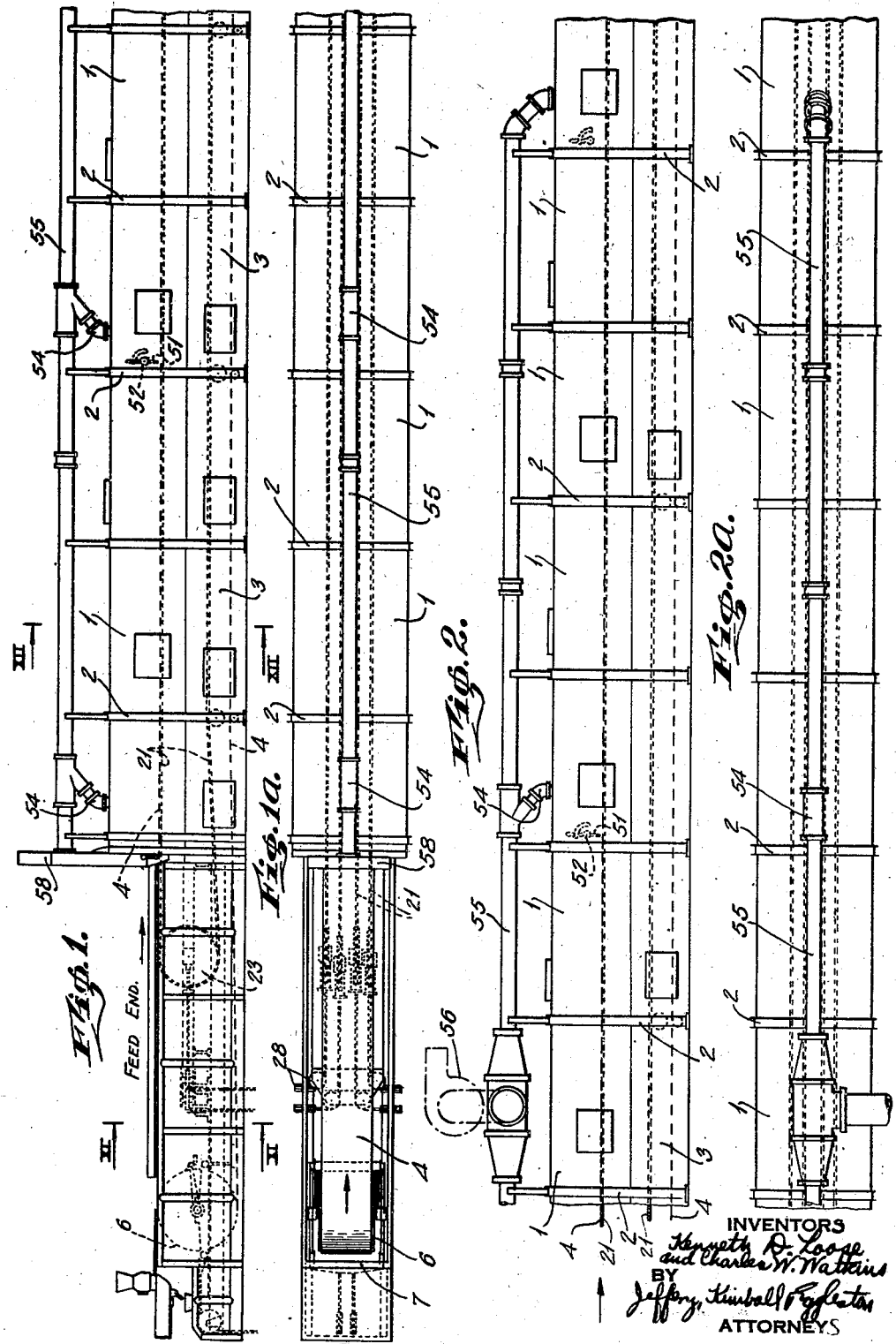

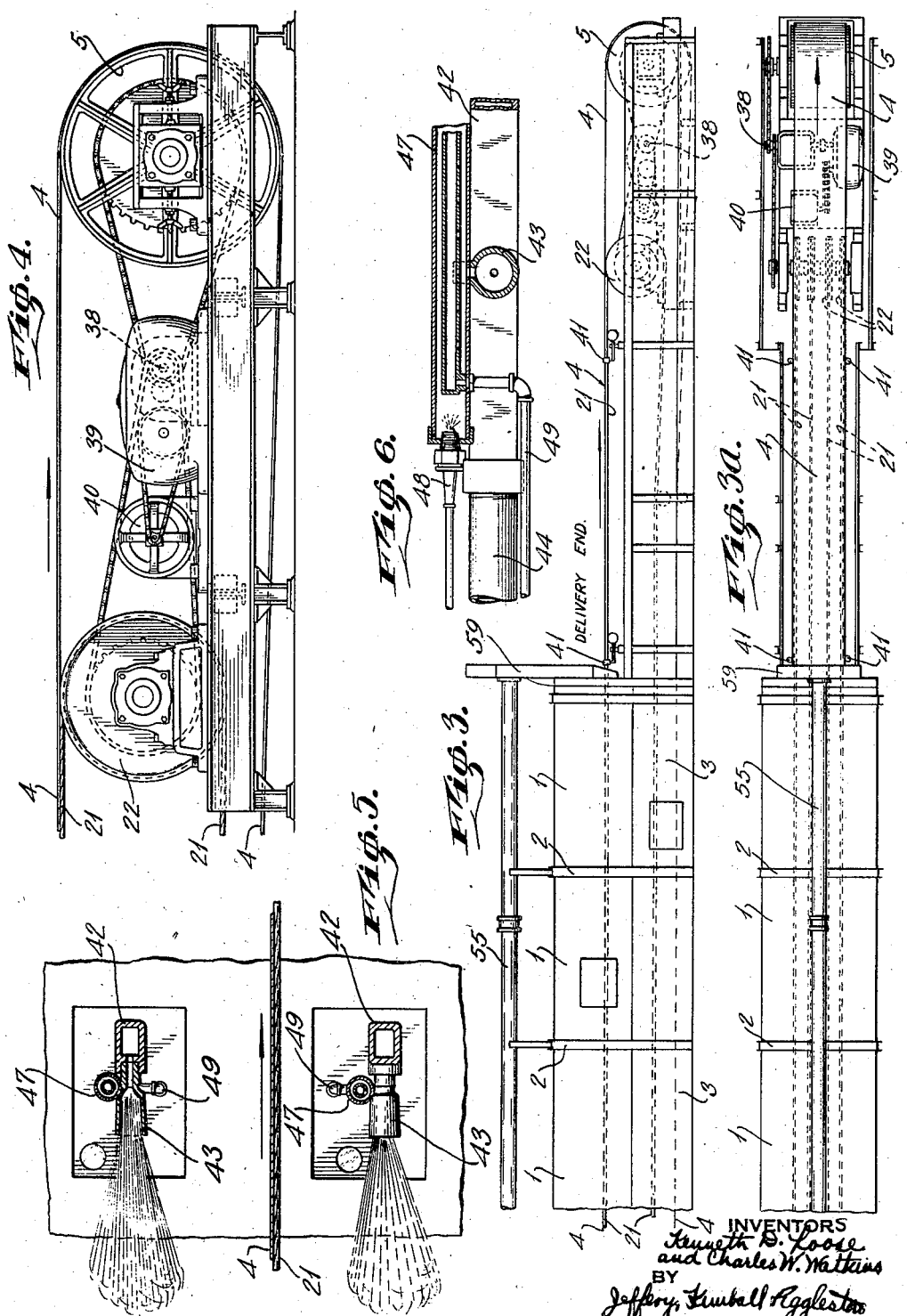

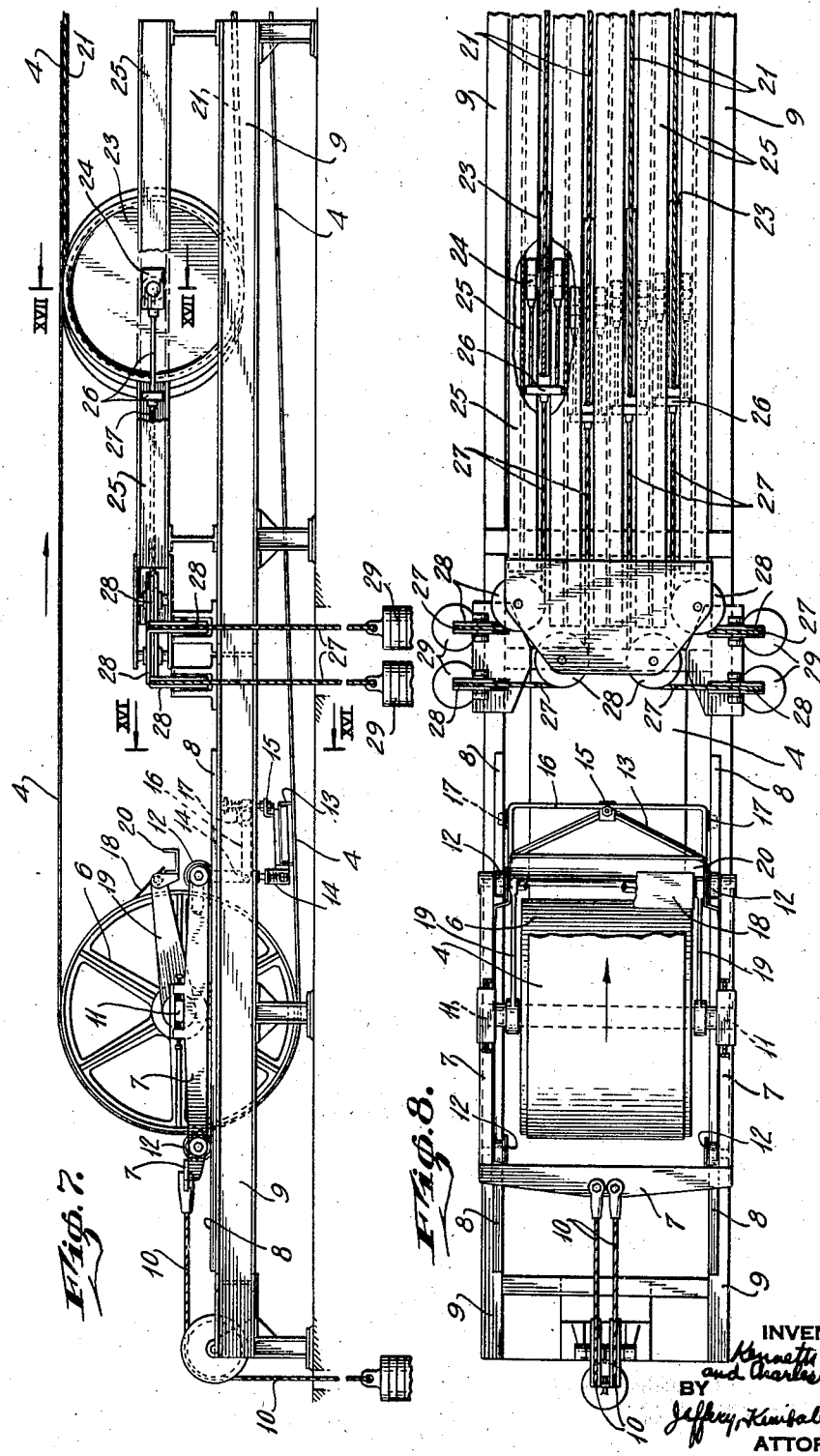

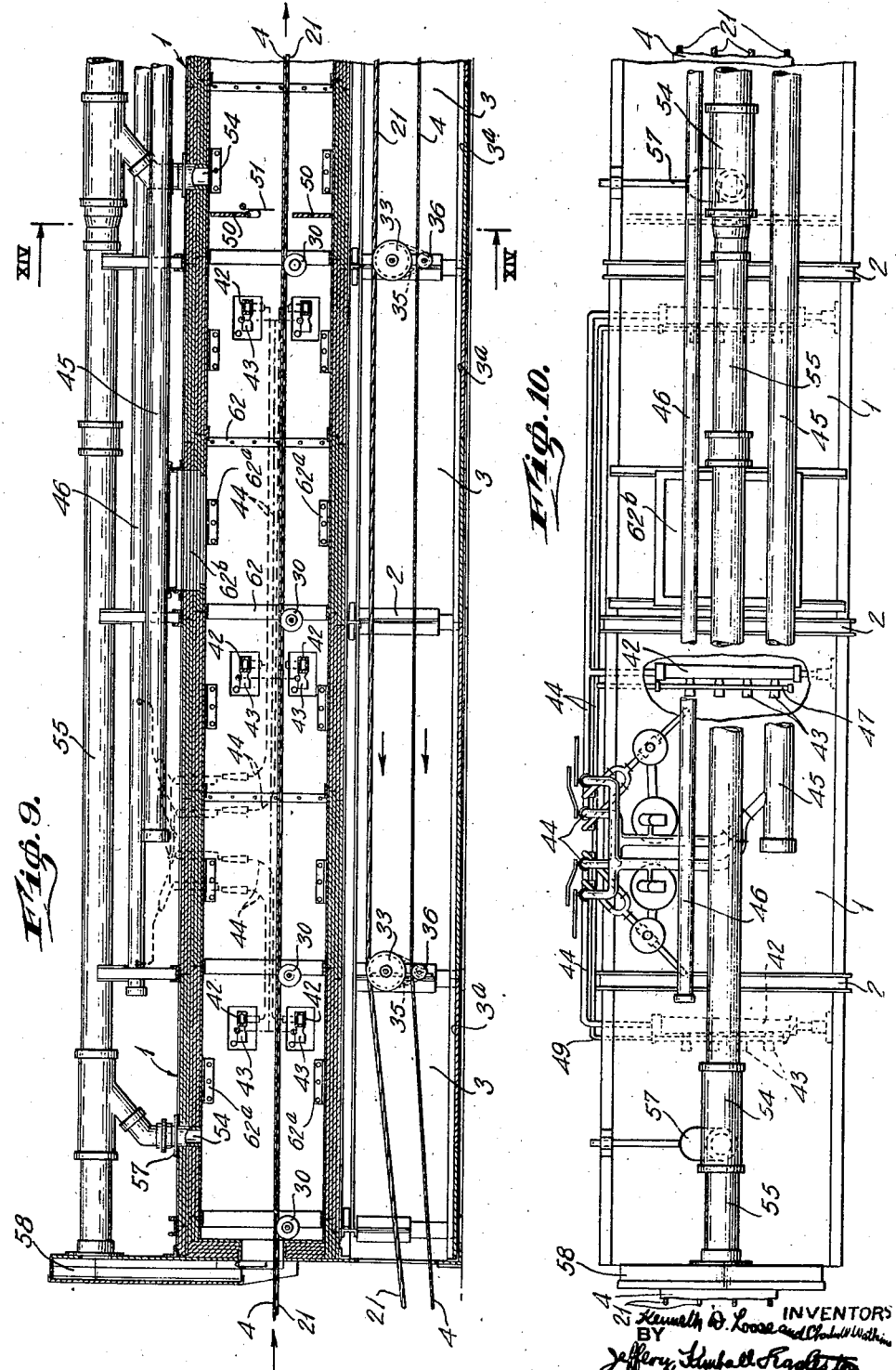

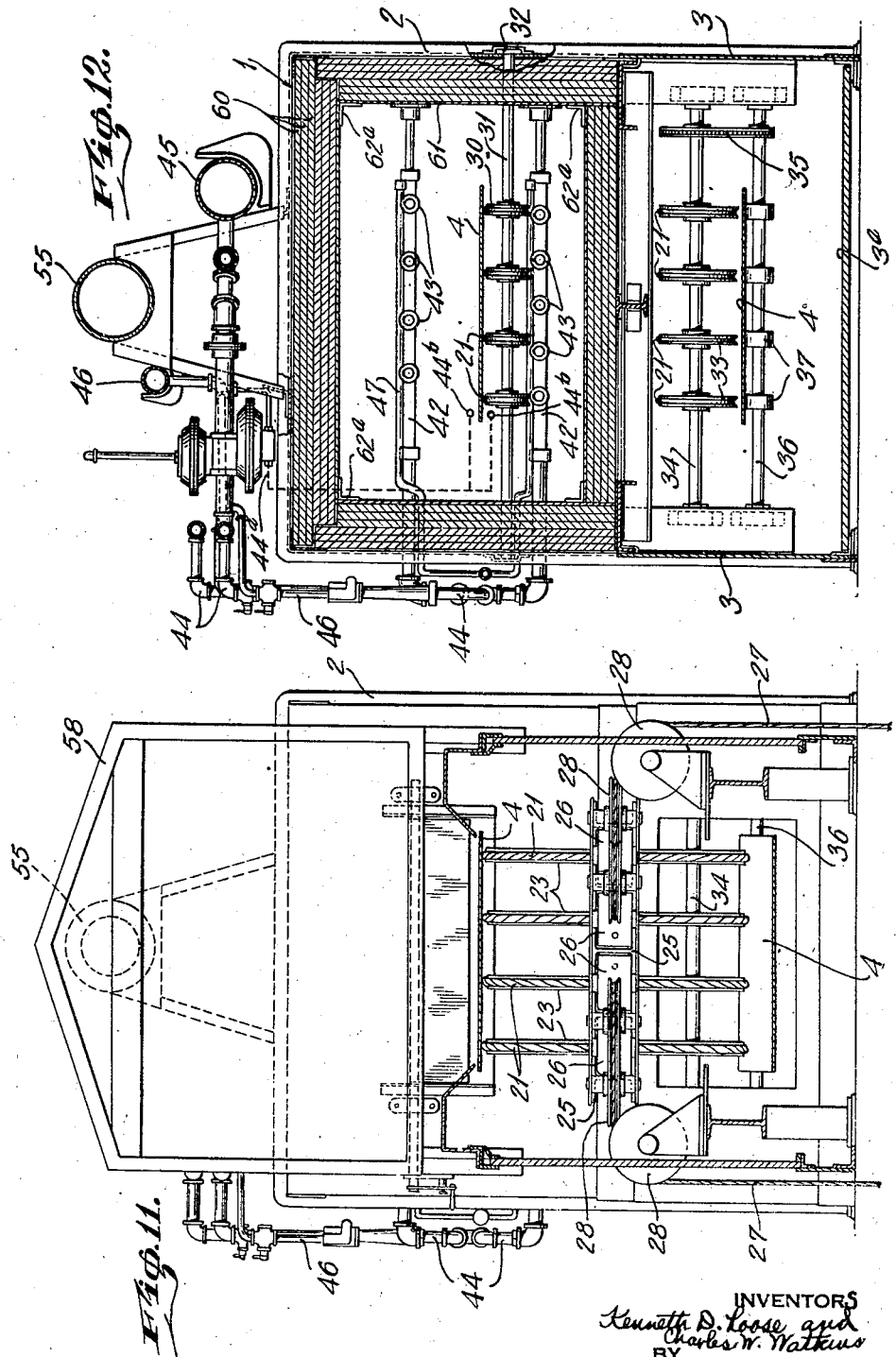

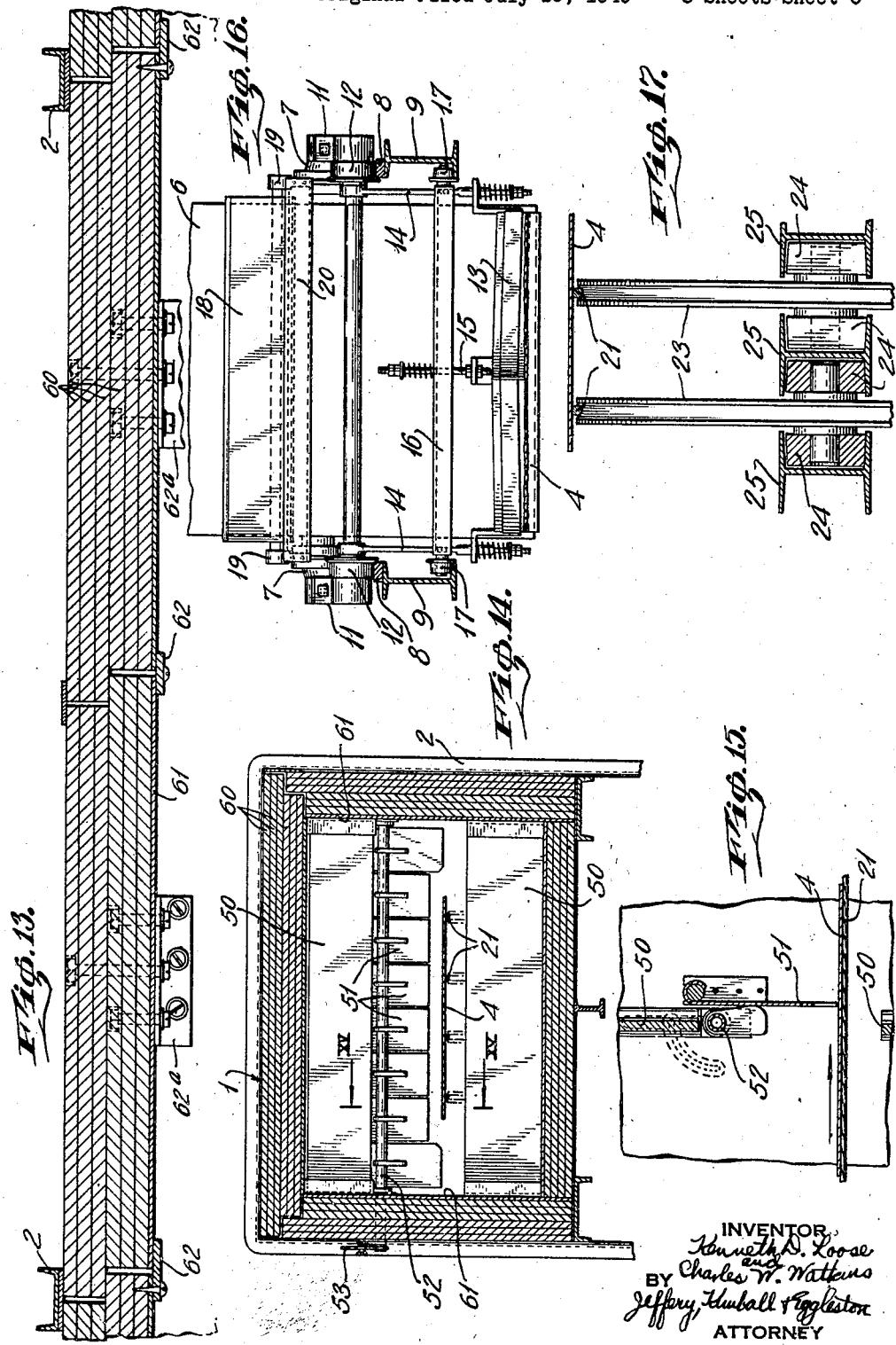

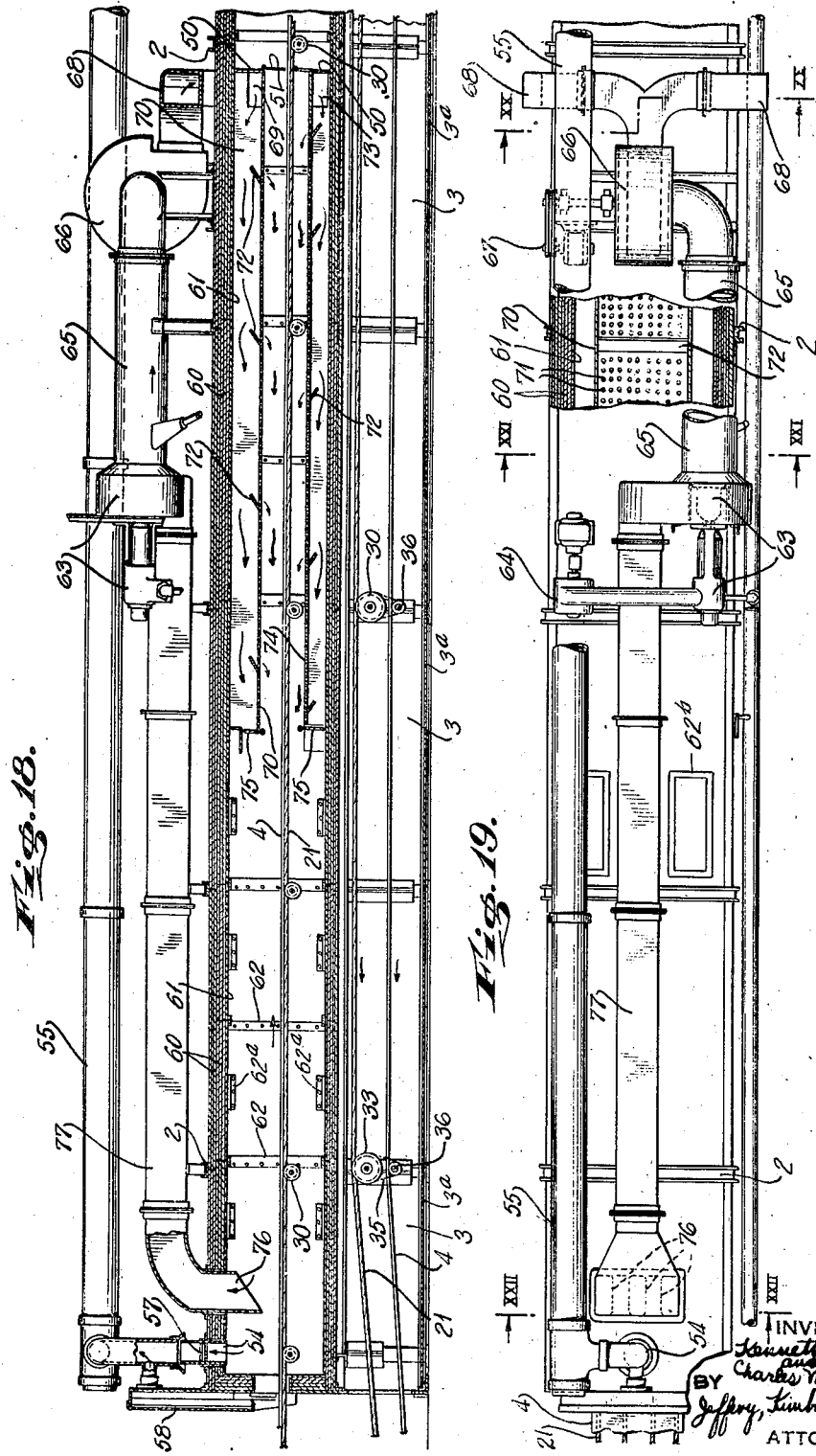

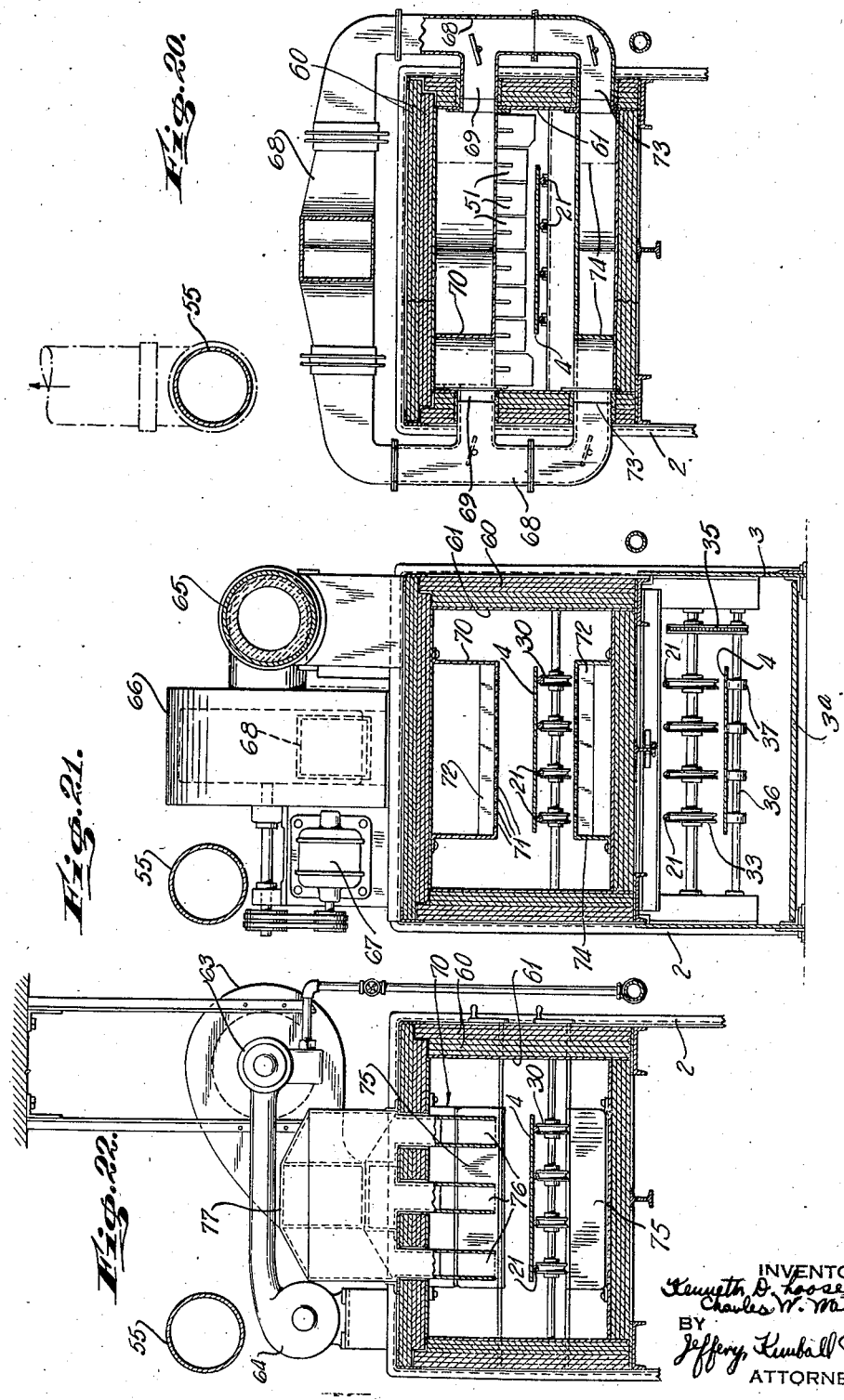

2,429,100

UNITED STATES PATENT OFFICE 2,429,100

CONVEYER FOR BAKERS' OVENS

Kenneth D. Loose, Bronxville, N. Y., and Charles W. Watkins, Dayton, Ohio, assignors to Loose-Wiles Biscuit Company, a corporation of New York Original application July 19, 1940, Serial No. 346,304, now Patent No. 2,327,727, dated August 24, 1943. Divided and this application February 25, 1943, Serial No. 477,160

11 Claims. (Cl. 214—21)

The invention relates to band ovens for baking biscuits, cookies and the like, though without limitation to any particular baked product, its general objects being to accomplish the baking process continuously, efficiently and at a high production rate. This application is a division of our copending application Ser. No. 346,304, filed July 19, 1940, and issued August 24, 1943, as Patent No. 2,327,727.

Inasmuch as baking requires the transfer to the goods of a definite amount of heat and inasmuch as such transfer must occur within a definite time period, it is obvious that the rate of production in band ovens depends on the length of the baking chamber or tunnel and the speed with which the goods pass through it, that is to say, for a given case, a longer band at higher speed gives the requisite baking period with a greater rate of production. One of the objects of this invention has reference to means of overcoming the mechanical difficulties which have heretofore limited band length and speed. These difficulties are primarily incident to unexpected and non-uniform thermal expansions and contractions which are increasingly manifest with longer bands making them exceedingly difficult to keep under control at the higher speed.

Fig. 1 is an elevation, and Fig. 1ᵃ a plan, of the feed end of the new oven;

Fig. 2, an elevation and Fig. 2ᵃ a plan, of a portion of the central part thereof;

Fig. 3, an elevation, and Fig. 3ᵃ a plan, of the delivery end;

Fig. 4, a larger scale side elevation of the drive head;

Figs. 5 and 6 are details of the burner construction;

Fig. 7 is a side elevation of the feed end;

Fig. 8, a plan thereof;

Fig. 9, a longitudinal vertical section of a portion of the tunnel near the feed end;

Fig. 10, a plan thereof;

Fig. 11, a cross section on line XI—XI of Fig. 1;

Fig. 12, a cross section on line XII—XII of Fig. 1;

Fig. 13 is a cross section of a portion of the tunnel wall illustrating its laminated construction;

Fig. 14 is a cross section on line XIV—XIV of Fig. 9;

Fig. 15 is a cross section on line XV—XV of Fig. 14;

Fig. 16 is a cross section on line XVI—XVI of Fig. 7;

Fig. 17 is a cross section on line XVII—XVII of Fig. 7;

Fig. 18 is a longitudinal section of the baking compartment section of the feed end of a band oven having a modified form of heat application;

Fig. 19 is a top plan thereof, partially broken out.

Fig. 20 is a cross section on line XX—XX of Fig. 19;

Fig. 21 is a section on line XXI—XXI of Fig. 19; and

Fig. 22 is a section on line XXII—XXII of Fig. 19.

The oven proper consists of a baking chamber in the form of a tunnel built of similar successive tunnel sections 1 supported in the upper parts of a series of upright external metal frames 2 rising from any suitable foundation which however does not require to be a massive foundation as usual because the weight per foot is well within ordinary factory floor load limits as later made apparent. These sections are conveniently about 8 feet long, and in the aggregate make a tunnel more than 100 and desirably about 500 feet which is much longer than hitherto considered practical for band ovens. The space below the floor of the tunnel is closed in by a series of panels 3, of insulating material referred to below.

The endless baking band 4 is trained over a head or driving drum 5 at the delivery end of the tunnel and a tail or take-up drum 6 at the dough-receiving or feeding end. Its upper run passes through the tunnel while its return run passes through the enclosed space under the tunnel, being suitably supported along the length of both runs as later described. This band is shown as an imperforate endless steel sheet approximating 32″ in width and .048″ thickness in the present case and is sufficiently flexible to be practicable for use on drums of reasonably small diameter as indicated but within the term "band" is included also woven-wire bands and any other conveyor suitable for supporting dough while baking. The direction of its travel is indicated by arrows.

The tail drum 6 (Figs. 7 and 8) is a tension and take-up drum, being arranged to keep an appropriate and constant tension on the band at all times while also accommodating its very considerable change of length due to temperature change, a matter of 3 feet or more according to circumstances. For this purpose, the drum is journalled in a wheeled truck 7 running on rails 8 secured to the tops of two main girders 9 which constitute part of the feed-end framework of the tunnel rigidly aligned with it. The truck is subject to the pull of a twin cable 10 supporting a suitable weight as the means of applying the tension and the drum bearings 11 on the truck are adjustable by means of the set-bolts indicated so that the angle of the drum axle can be minutely changed as required to counteract any tendency for the band to work itself toward one side or other of its proper course. This adjustment is made secure by giving the truck a long wheel base on its rails and by using flanged wheels 12 which fit the rails snugly thus to prohibit any lateral movement of the truck on the rails and insure that the closely adjusted angle given to the drum will continue permanent as the length of the band changes under varying temperature.

The drum truck carries a clearer for the inner face of the band in the form of a plough 13 resiliently supported in any suitable way, the purpose of which is to clear the band of any foreign matter or object which might interfere with traction or injure the band if caught between it and the drum. The method of suspension comprises two spring-containing links 14 (Fig. 16) hung from the truck to carry the wide end of the plough and a front link 15, also including a spring, to carry the apex of the plough. This link is hung from a cross yoke 16 supported in part by the links 14 and by rollers 17 which run on the interior flanges of the side girders 9. The springs in the links counterpoise the plough so that it floats or bears gently on the band, that is, with less than its full weight, thereby avoiding unnecessary friction and band wear. Being carried by the truck, the plough is located at the end of the return run of the band and remains close to the drum under all thermal conditions.

The tail drum 6 is also furnished with a doctor knife 18 to keep it clean. This is carried on the fixed arms 19 and provided with a trough 20 to catch the scrapings.

The working run of the band within the oven tunnel rests on and is driven by the upper runs of a system of parallel endless steel cables or wire ropes 21 which carry the heavy vertical load and the driving tension. These cables are trained over a set of drive sheaves 22 at the delivery end and over a corresponding set of take-up and tensioning tail sheaves 23 at the feed end and their return runs pass below the tunnel where they are supported by a number of intermediate sheaves or carriers presently referred to. The whole system is located within the confine of the band, between its upper and lower runs, and the upper runs of the cables form a support for the band which is co-extensive with nearly its full length and on which the upper band-run rests with no other than frictional connection with it. The cables, it will be understood, are essentially tension members which take the longitudinal strain to which the band would be subject without them; they constitute the means whereby the long band can be driven at the required high speed without injury to it; also they admit of the use of wire-mesh bands in lighter weight and wider mesh than heretofore possible so that more nearly equal top and bottom baking effects on the goods can be produced, which fact substantially enlarges the field of use of band ovens.

The cable tail sheaves 23 are journalled side by side, but each independently of the others in a pair of slipper blocks 24 which are confined to slide in or between the opposing channels of parallel I-beams 25 (Fig. 17), the latter being part of the feed-end framework carried on the side girders 9. The two blocks for each sheave are connected by a yoke 26 to a weighted tension cable 27 which is guided around the edges of the lower stretch of the band by appropriate corner pulleys 28 so that the weights 29 can hang below and at the side of the feed-end framework.

The intermediate carrier sheaves above referred to are marked 30, and occur in sets at appropriate intervals along the tunnel, preferably one set for each of the (8 foot) sections. The sheaves of each set are fast on axles 31 which extend across the tunnel and through the thickness of the tunnel walls to their bearings 32 (Fig. 12) which are placed on the outside of the wall where they are not only accessible for lubrication but also sufficiently removed from oven heat so that the lubricant is not decomposed.

Since each cable is equally tensioned with the others their upper runs occupy substantially a common level and form a platform support for the band which is practically flat. It is so indicated in the drawing, but actually and as will be understood, both the cables and band sag somewhat between the carriers. It is desirable for high speed operation that the band make and preserve a continuous or line contact with each one of the cables so far as possible and this object is accomplished according to this invention partly by the independence of the means for tensioning the band and cables, thus permitting the appropriate tensioning force to be applied to each, and partly by the selection of an appropriate lateral separation of the cables.

This spacing is correlated to the crosswise flexibility of the band, so that the latter can find a seat or bearing on each cable notwithstanding slight variations in their respective elevations. It thus derives uniform driving force from each. In the case in hand, the spacing distance is about 8½ inches requiring four cables for a sheet-steel band of the particular weight and width employed. We have found, however, that too wide a spacing is to be avoided since it tends to band-fatigue under the load of the dough and too close spacing tends to unbalance the contact, and hence to unequalized driving of the band giving it a tendency to wander from its course which must at all cost be prevented. We find that the number of cables in the system must be selected with reference to the establishment of continuous cable contact with the band.

As also contributing to the uniformity and balance of the band drive, the tail sheave supports or slipper-blocks 24 are purposely loosely fitted in their slide-way channels in the beams 25 so that the sheaves are free to change their angles slightly in accommodation to the angle of approach of the cables, which at times tend to deviate from normal producing momentary variation of the cable tension. By making each take-up sheave self-adjusting in this way, the cables are best adapted to preserve continuous equal contact with the band so as to keep it running smoothly and in its true course notwithstanding that it is without mechanical attachment to them.

Also in this same connection, two of the four cables are laid up with a hand or direction of twist opposite to that of the other two, thus balancing the tendency otherwise present for the cables to work the band out of center.

While the carrier sheaves 30 appear to be all of equal diameter it is preferred to make the two outside sheaves of each set of slightly larger diameter, but not more than will raise the margins of the band about $\frac{1}{16}''$ above its center. This gives the band a very slight crosswise curvature which, though unperceptible to the eye, contributes stiffness to the band against horizontal flexure and thereby aids in keeping it in its straight course. The return carrier rollers 39 are also preferably designed on the same principle.

These precautions are cumulatively important factors in safely obtaining high speed of the long irregularly expanding band and eliminating the need for edge-guiding flanges or rollers within the tunnel which would be objectionable because, in oven heat, they could not easily be kept lubricated and even though lubricated would result in wear or deformation of the edge of the band.

The return runs of the cables are carried on a succession of carrier sheaves 33 arranged in sets fast on axles 34 which are journalled below the tunnel floor but at the same time set high enough so that they are more or less positively driven by the cables. Thus driven they are geared by sprocket chains 35 to drive the cross shafts 36, journalled just below them, which latter are provided with roll bosses 37 and support the return stretch of the band helping it along by their rotation.

The drum and driving sheaves are sprocket-chain geared to a common shaft 38, driven through a variable speed transmission 39 from an electric motor 40 and these driving members are also disposed between the upper and lower runs of the band, that is to say, inside of the delivery end of the band and therefore out of the way of whatever means may be employed for removing the baked goods. We have found that the head drum 5 requires to be driven at a slightly higher circumferential speed than that of the driving sheaves 22 in order to insure that there shall be no relative movement between the band and the cables which conduces to wandering of the band from its course.

With the construction described, all the guidance needed to keep the long, flexible and high speed band running true on the cable system can be accomplished by one, or at the most two, so-called automatic belt-aligners. These are well known devices indicated conventionally at 41 in Fig. 3. They can be placed outside of the oven and therefore be lubricated and they work with minimum friction on the band.

The baking heat is applied by a current of hot combustion gases flowing longitudinally through the tunnel. In the case of the oven shown in Figs. 1–17, which is gas-fired, the current of hot gas is derived from a series of gas burners 42 of a type not heretofore used in band ovens. These burners are supplied with fuel-gas and air, both under slight pressure, to form a mixture which burns from the flaring nozzles 43 of which there are several to each burner. By reason of the supply pressure, and principally by reason of the expansion in the nozzles, the flames are projected several inches from the burner orifices, on which account the burners are properly termed blast-type. They are arranged crosswise of the tunnel, with one four-nozzle burner above the band and one five-nozzle burner below the band in each tunnel section, all projecting their flames horizontally and in the same direction, so that in the aggregate they create, by the effect of their own energy a turbulent baking current of considerable horizontal velocity, counter to the direction of band travel.

Fuel-gas and air are supplied to the burners 42 by a pipe system, designated generally by the reference 44, which takes its gas and air from the manifolds 45 and 46 respectively mounted on top of the tunnel and will be understood to have all the necessary and proper mixing and regulatory adjuncts, including thermostatically governed valve mechanism $44^a$ subject to control by thermostatic bulb elements $44^b$ located inside the tunnel (Fig. 12), the purpose being to maintain automatically constant, pre-selected rates of heat transfer to the goods.

The fuel system includes also a pilot ingition system (see Fig. 6) represented by the manifold tubes 47, one of which is common to all of the nozzles of each burner and supplied with a spark plug 48 to ignite a special explosive fuel mixture supplied to it through a pipe line 49.

The course through the baking tunnel is divided into a series of compartments each about 32 feet long, or otherwise as desired, and each of which can thus be separately controlled as to temperature according to the requirements of the sort of goods to be baked, that is to say, each may have its own thermostat ($44^b$) controlling the temperature therein according to the desired progress of the baking action. These compartments are desirably separated from each other by interior baffles or partitions such as indicated at 50 in Fig. 9. The upper section of each partition includes a series of hinged flaps 51 (see Fig. 14) which hang toward the top of the band and at its sides, and these are so mounted that they may all be rocked to an open position when desired by turning the shaft 52 by means of its exterior crank 53 also shown in Fig. 14, thereby enlarging the communication between adjacent compartments.

Each tunnel compartment is provided with an exhaust outlet 54 by which steam, gases from the goods and products of combustion are withdrawn to the exhaust manifold 55 by the suction of a fan 56 (Fig. 2) and in each case these outlets are located at the feed ends of the compartments next to the partitions 50, so that the fan suction assists the gas current through the tunnel, this being under the control of slide dampers at the outlets as indicated at 57 in Figs. 9 and 10. Irrespective of the partitions 50, it may be noted that this distribution of the exhaust outlets naturally divides the tunnel into baking compartments in which the baking conditions as to heat and moisture can be individually controlled.

As customary in band ovens the entrance and exit door-ways, at the ends of the tunnel, are protected by exhaust hoods 58 and 59 connected to the ends of the exhaust manifold 55, so that combustion gases do not escape into the building.

The baking tunnel is constructed of floor panels resting on longitudinal sills secured to the frame uprights 2, side-wall panels rising from the floor panels within the upright, and roof panels spanning the side walls. The nature of the material used to form these panels exercises an important influence on the operation of the oven as presently explained. Each panel is laminated of flat slabs 60, cast of wet cementitious material which has been aerated before setting so that it sets as a porous, light and rigid slab and has sufficient strength to serve as a structural building element. Specifically the preferred material is a gypsum plaster slab of which several types are to be had. A wall thickness of six one-inch slabs of this material is used for the side walls and roof, and four suffice for the floor, the space below the tunnel being enclosed as before stated. Baking temperatures in the order of 500°–600° F. and the temperature in the under-tunnel space runs at about 350° F. A similar slab 3ª is desirably used as the floor of this space to insulate it from the building floor as shown in Fig. 12.

The tunnel shown is internally lined, more particularly as protection against possible mechanical injury, by thinner (½") slabs or sheets 61 of a generally similar cementitious but harder material. The junctions between sheets are covered with battens 62 of the same material and short corner braces 62ª are used in the center of each section to hold the panels together.

It will be understood that the several panels are appropriately mounted in the framing with the necessary clearances to permit their thermal expansion harmlessly; also the individual laminations of each panel are held together so that any differences in their individual expansions will not warp the panel. This is done by localizing the uniting bolts (not shown) at the midportions of the panels, as will be understood. Thus constructed, it is to be noted that no metal is present in the tunnel walls except for the small corner brackets 62ª and such bolts as unite the laminations. The opening in the roof shown at 62ᵇ in Fig. 9 is an explosion vent normally lightly closed. Inspection windows are also provided at appropriate intervals.

In such an oven as above described, heat transfer to the dough carried on the band occurs principally by convection and conduction, and to only a minor degree by radiation; that is to say, most of the heat units required for baking are carried to the dough directly by the stream of hot gas flowing in the tunnel in contact with it rather than by radiation from the walls of the tunnel and other bodies therein, such heat as is received by the metal band passing by conduction through the latter to the dough. Heretofore radiant heat has been chiefly relied on for the baking effect in band ovens, the radiation being from the walls and from numerous burners or other heating elements located along the length of the oven.

The relative suppression of radiant transfer affords the important advantage of a closer relation between the rate of fuel supply and the thermo-chemical change that constitutes baking. It permits a nicety of regulation of the baking process, whether performed manually or automaticaly, that avoids a wastage of product that otherwise might be prohibitive in ovens of such large capacity, and incidentally it makes for better baking; also it quite effectually eliminates the tendency for the goods to overbake along the margins of the band from the radiant side-wall heat and therefore it does away completely with the need for marginal shields or other protectors for the goods such as have been heretofore resorted to in the effort to secure an even bake across the band.

According to the thermal law, the rate of heat transfer from hot gasses to other objects is proportional to the relative velocity of the gas with respect to such objects, and therefore in the present case the convection transfer of heat to the goods occurs at a high rate because the relative velocity is high, being the sum of the gas velocity plus that of the band speed, the latter being in the order of 100 feet or more per minute. An optimum condition for convection transfer to the goods is thus established.

Since all bodies have the property of radiating heat it is not possible entirely to eliminate the radiant effect in band ovens. The oven walls and other parts, particularly metal parts in the tunnel, being also swept by the hot gases, necessarily receive and accumulate heat some of which is radiated to the goods but, in the present case, the walls are swept by a less relative velocity of gases than the band and dough (by the amount of the band speed) and are therefore less favorably disposed for taking up heat and therefore relatively less active as heat-delivering surfaces. By taking advantage of this fact we have found that the radiant baking effect can be reduced to such extent, relatively to the amount of baking heat transferred by convection and band conduction, as to make its influence unobjectionable from the point of view of baking control.

The wall slabs of aerated plaster compound above referred to are selected because they are not only good insulators but are of low density and very low heat capacity being also very light. They weigh in the order of less than 50 lbs. per cubic foot. This is much lighter than fire-brick, building-brick, or even those flocculent or granular insulating materials commonly used as insulating filling between metal casement panels. Besides which these slabs have the advantage that their strength and rigidity, as already pointed out, enable the tunnel walls, including the roof, to be built of them exclusively with the use of little or no metal, thereby producing a surrounding enclosure for the high-speed baking band having the least possible heat-radiating property.

To the same end of minimizing the heat capacity or radiant baking effect, all those metal parts inside the tunnel that are incident to the transport of the goods through it, as well as those parts which concern the distribution and flow of the combustion gases, are made as low in total mass as consistent with their proper functioning. The combined weight of the steel band and the four cables, for example, is less than 7 lbs. per linear foot and is less than 6 lbs. in the case of a wire-mesh band. The intermediate cable carriers, although they occur only at intervals, are similarly made of no more mass than required for their functions, as is true also of the burner-bodies. Not counting the band, the whole tunnel employs less than 30 lbs. of metal per linear foot of tunnel (specifically 22.5 lbs.). The total metal mass per foot will thus be seen to be extremely low as compared to prior tunnels of comparable section. For example, in a particular prior and well known type of band-oven, in which the walls are metal lined as customary, the lining alone ($\frac{3}{32}$" thick) weighs 3¾ lbs. per square foot and in the aggregate such an oven contains 126.5 lbs. of metal per linear tunnel foot, not counting the conveyor member, all of which represents a large heat-radiating capacity. In prior structures, when adjustment is made to reduce oven temperature the interior metal parts act as sources of heat and delay the change, and conversely, when it is sought to raise the oven temperature, they absorb heat and delay the effect, thereby imposing a time lag in temperature change which greatly interferes with the maintenance of constant temperature, and renders impractical the use of thermostatic regulators for that purpose. In the new oven, on the other hand, having practically no interior metal, and in which the dough is surrounded only by walls of light weight and low density and heat capacity, the time lag is minimized to a degree that is negligible and thermal regulation is thus made so effective that the progress of the baking process can be automatically and continuously maintained according to any predetermined plan.

Referring to Figs. 18–22 the oven, band and cable system will be recognized as the same as that already described. The zone of combustion, however, is outside of the oven and in the form of a burner 63, designed to burn oil, for example, and operated by a motor-driven fan 64, the burner detail not being important to this invention. There is one such burner for each baking compartment. It delivers its hot combustion products together with any excess air and perhaps other gases directly into the intake flue 65 of a fan 66, driven by a motor 67, whence they are discharged at a selected temperature into a longitudinal flue above the tunnel having branched flues 68 leading down the sides of the tunnel with outlets into the tunnel respectively above and below the baking band and on both sides. The upper flue outlets 69 pass the hot gases, under appropriate damper regulation, as indicated, into an internal duct 70 suspended from the tunnel roof and extending not more than about half the length of the particular baking compartment. This duct can be made of light sheet metal if desired in which case its wall thickness will be considerably thinner than indicated in the drawing. In any case its heat capacity is low. Its floor is provided with many holes 71 (Fig. 19) and occasional deflectors 72 slanted toward the holes.

The lower outlets 73 (Fig. 20), from the branched flues 68, pass the combustion gases, also under appropriate damper control, into a similar lower internal duct 74 mounted on the floor of the tunnel.

The upper and lower ducts, 70 and 74, are provided with damper-controlled outlets, 75, at their far ends, adjustable from outside the tunnel, and it will be recognized that the purpose of this construction is to admit the gas-flow, so that it will not have too violent impact on the goods at its point of entry or tend to concentrate its heating effect at any particular locality while at the same time producing the adequate longitudinal gas velocity which, as before, is at a high rate and counter to the band travel. By means of the dampers 75 the velocity in the two ends of a compartment can be adjusted.

The gases leave the compartment by the outlet 76 which is represented in the present case by three laterally separated hoods 76 let into the tunnel roof and leading through a single return flue 77, on the tunnel top back to the place of combustion or burner 63. There is thus a closed combustion circuit, including the tunnel compartment and enough air as may be required for combustion is delivered into this circuit by the fan 64, while a constant excess of tunnel gases, steam, etc. is being evacuated through the suction exhaust outlets 54 and manifold 55.

The tunnel walls will be understood to be of the same light weight and low heat capacity as above described and it may be stated that the interior distributing ducts, when made of metal, do not add appreciably to the total mass of exposed metal per tunnel foot, since they are in substitution for the metal burner and pilot system used as the heat source in the gas-fired oven and not used in this form. The thermal characteristics are therefore the same as in the gas-fired form and are such as to insure that the baking occurs mainly by convection and least by radiation and therefore with the advantages above pointed out.

It will be understood that within the principles above explained, band-ovens can be constructed in many variant forms and of any length required and that there is no intended limitation to either of the forms herein used for exemplification, nor to any of the detail thereof except as specified in certain of the claims.

We claim:

1. In a band oven, an endless baking band trained over a drum at each end of the baking tunnel, one of the drums being journalled on a truck, a guiding track for the truck confining it to move only in a direction parallel with the tunnel axis, means for angularly adjusting the drum axis with reference to such truck and means for applying constant band-tensioning force to the truck.

2. In a baker's band oven, a baking tunnel, an endless substantially flat metal baking band trained over head and tail drums at the ends of said tunnel with its working stretch within the tunnel, a system of parallel endless cables forming a driving support for said working stretch within the tunnel, and means for taking up thermal changes originating in the tunnel comprising a truck supporting one of said band drums, a track for guiding the truck to move in strict alignment with the tunnel axis, means for angularly adjusting the drum axis with reference to such truck and means for applying a constant tensioning force to the truck.

3. A baker's band oven, a tunnel, a flat steel baking band, and a cable system carrying and frictionally driving the working stretch of the flat band through the tunnel comprising a plurality of parallel cables some of which are of opposite hand of twist to the others, and independent tensioning means for the cable stretches adapted for maintaining them in contact with the band under changing oven temperature.

4. In a baker's band oven comprising a baking tunnel and an endless substantially flat sheet metal baking band having its working stretch running through the tunnel, means for supporting and driving said working stretch in the tunnel comprising a system of parallel endless cable stretches, automatic take-up means for maintaining said stretches at a substantially common elevation whereby said flat band rests uniformly upon them and another automatic take-up means for said band adapted to take up thermal changes in the length thereof, and means wholly outside the tunnel for guiding the course of the band against lateral deviation.

5. In a band oven, a conveyor structure comprising a system of parallel, separated stretches of metallic cable supported at a common level and individually tensioned to maintain such level while in action, an endless sheet-metal band of substantially flat cross-section having its working stretch resting on such cable stretches and having only a friction contact therewith for maintaining its position thereon, head and tail drums over which said band is trained under constant tension, head and tail sheaves for said cable stretches located in the space between the runs of the band, and means for guiding the course of the band located adjacent to one of said drums and wholly outside of the oven in which the band travels.

6. In a band oven, a conveyor structure comprising a system of parallel, separated stretches of metallic cable supported at a common level and individually tensioned to maintain such level while in action, an endless sheet metal band of substantially flat cross-section having its working stretch resting on such cable stretches and having only a friction contact therewith for maintaining its position thereon, head and tail drums over which said band is trained under constant tension, head and tail sheaves for said cable stretches located in the space between the runs of the band, means outside of the oven for guiding the course of the band, and means for driving the head drum at a slightly greater circumferential speed than the head sheave.

7. In a band oven, a baking tunnel, a drum journaled at each end of said tunnel, an endless substantially flat metal band trained over said drums and having at least one of its runs disposed within said tunnel, and means to support said run of the metal band within the tunnel comprising two sets of cable sheaves located between the two runs of said band and between said drums, one set of sheaves being located adjacent one of said drums and the other set being located adjacent the other drum, endless cables trained over said sheaves and each of said cables having at least one run within said tunnel, said run of the metal band resting on and being supported by the said runs of said cables, a journal bearing for each of said sheaves of one of the said sets, guides for each of said journal bearings located between the runs of said band and extending parallel to the band, said bearings being slidable in said guides independently one of another, and means for applying tension to said endless cables comprising a tension cable connected to each of said journal bearings, guide means directing each of said tension cables from its journal bearing parallel to said band and thence outward from between the runs of said band, and a tensioning means for each of said tension cables located outside of the said band.

8. In a band oven, a baking tunnel, a drum journaled at each end of said tunnel, an endless substantially flat metal band trained over said drums and having at least one of its runs disposed within said tunnel, and means to support said run of the metal band within the tunnel comprising two sets of cable sheaves located between the two runs of said band and between said drums, one set of sheaves being located adjacent one of said drums and the other set being located adjacent the other drum, endless cables trained over said sheaves and each of said cables having at least one run within said tunnel, said run of the metal band resting on and being supported by the said runs of said cables, bearing means for the sheaves of one of the said sets substantially fixed in position, power means to drive the sheaves of said set, a journal bearing for each of the sheaves of the other of said sets, guides for each of said journal bearings located between the runs of said band and extending parallel to the band, said bearings being slidable in said guides independently one of another, and means for applying tension to said endless cables comprising a tension cable connected to each of said journal bearings, guide means directing each of said tension cables from its journal bearing parallel to said band and thence outward from between the runs of said band, and a tensioning means for each of said tension cables located outside of the said band.

9. The subject matter of claim 7, characterized by the fact that the runs of the endless cables within the tunnel are supported at a common level, and means are provided for conjointly driving the endless cable system and the head drum of said band.

10. The subject matter of claim 7, characterized by the fact that the said journal bearings are loosely mounted in the said guides so that the sheaves of the said set can turn angularly to accommodate the angle of approach of their respective endless cables.

11. In a band oven, a baking tunnel, a frame structure fixed at one end of the tunnel and including horizontal beams providing upper guideways and a lower guideway, said guideways extending in the same direction as said tunnel, a truck movable on said lower guideway, drums at opposite ends of the tunnel, one of said drums being journaled on said truck, a baking band carried by said drums and passing through said tunnel, a set of cable sheaves at each end of said tunnel, bearings for the sheaves for one of said sets movable in said upper guideways, band-supporting cables carried by the said sheaves, and means tending to move said truck and said bearings along said guideways to tension said band and cables.

KENNETH D. LOOSE.
CHARLES W. WATKINS.

REFERENCES CITED

The following references are of record in the file of this patent:

UNITED STATES PATENTS

| Number | Name | Date |
|---|---|---|
| 689,881 | Hoy | Dec. 31, 1901 |
| 843,018 | Jameison | Feb. 5, 1907 |
| 1,313,111 | Page | Aug. 12, 1919 |
| 1,497,619 | Waechter et al. | June 10, 1924 |
| 1,626,041 | Kyle et al. | Apr. 26, 1927 |
| 1,667,765 | Bausman | May 1, 1928 |
| 1,679,717 | Greer | Aug. 7, 1928 |
| 1,726,555 | Gammeter | Sept. 3, 1929 |
| 1,933,485 | Rund et al. | Oct. 31, 1933 |
| 1,970,842 | Crossen | Aug. 21, 1934 |
| 1,971,766 | Byron et al. | Aug. 28, 1934 |
| 1,975,591 | Sinden | Oct. 2, 1934 |
| 2,157,301 | Neuman | May 9, 1939 |